May 24, 1966 F. S. GATERMAN 3,252,716
QUICK CHANGE LIFT ARM ARRANGEMENT FOR SUPPORT STRUCTURE
AND METHOD OF SECURING AN ATTACHMENT THERETO
Filed Aug. 13, 1963 3 Sheets-Sheet 1
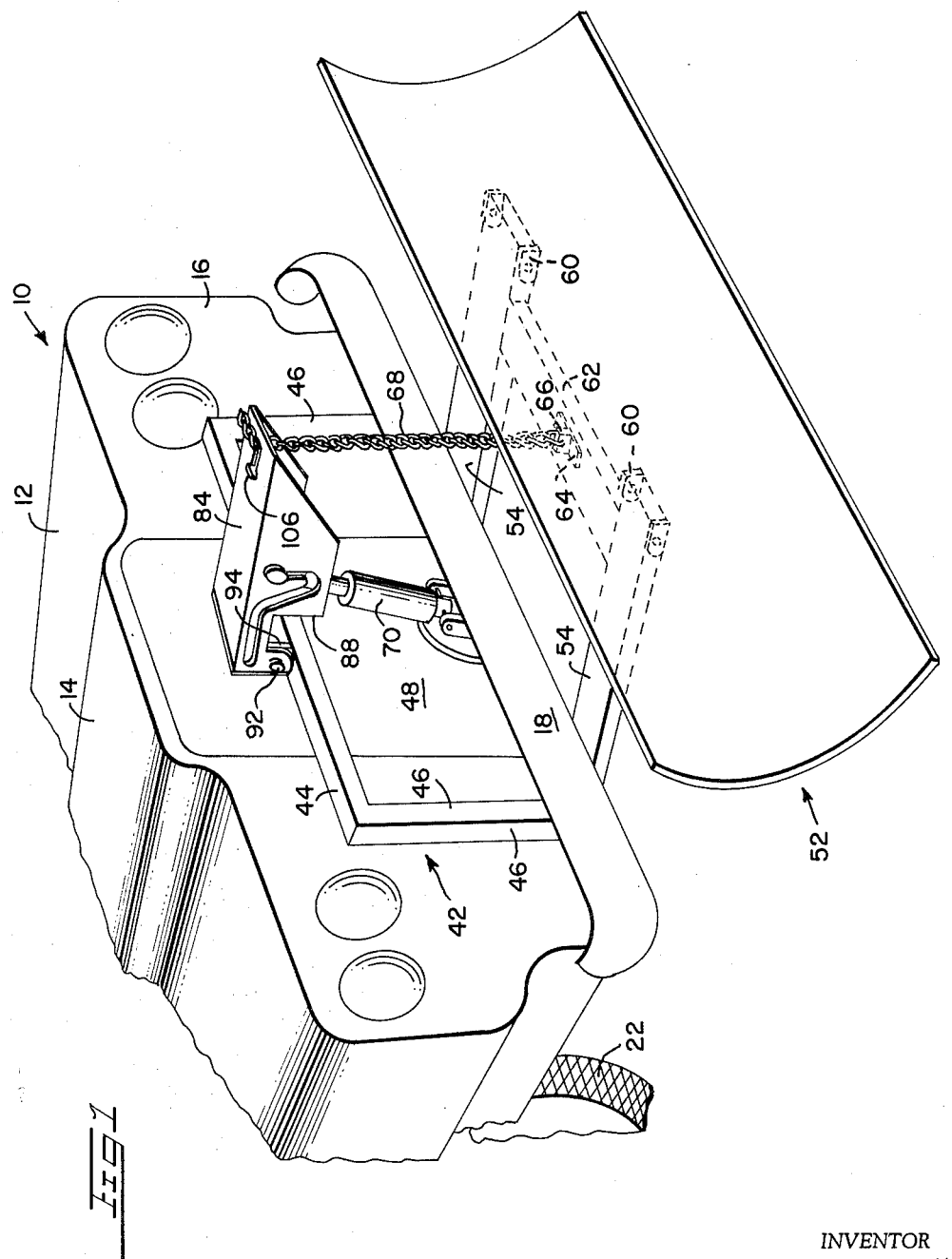
INVENTOR
FLORENCE S. GATERMAN
BY
ATTORNEY

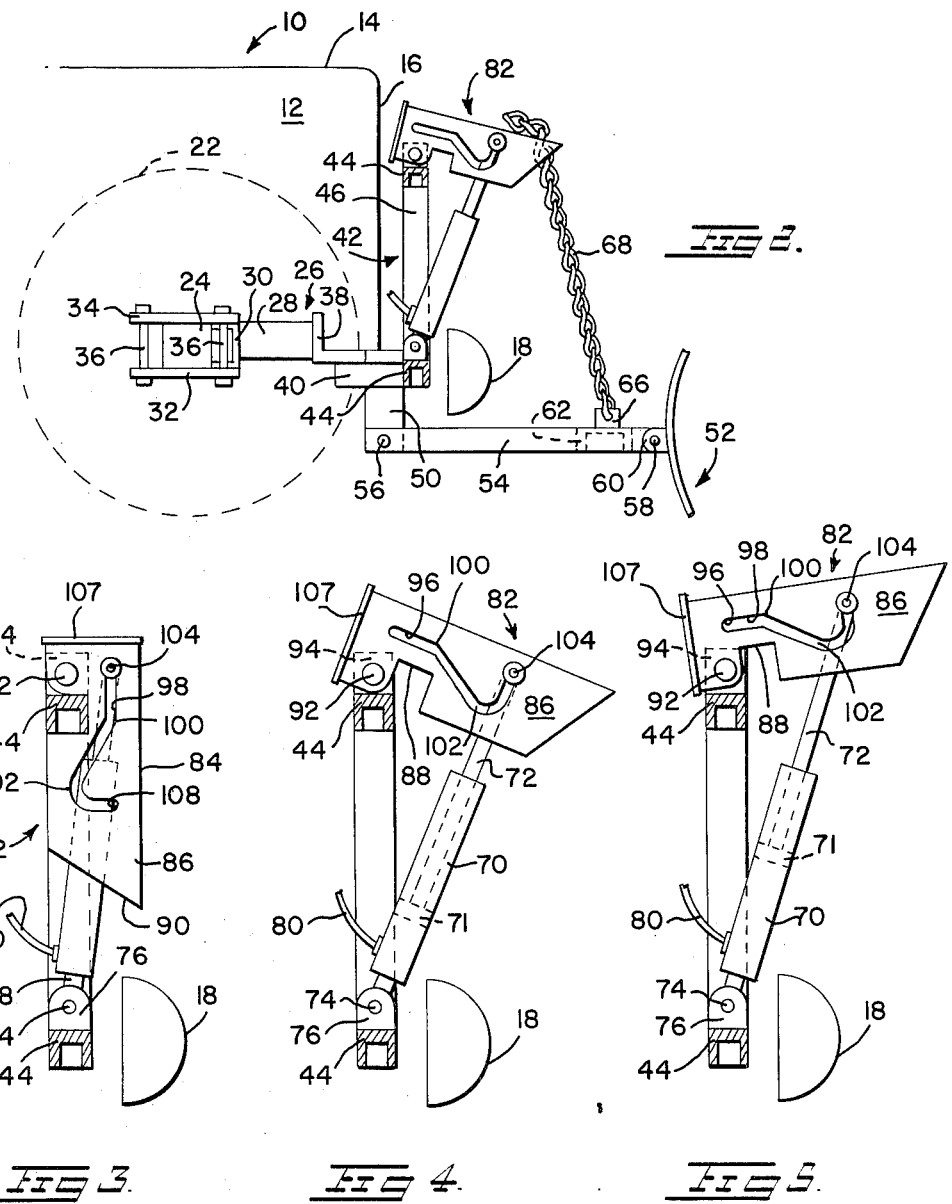
May 24, 1966   F. S. GATERMAN   3,252,716
QUICK CHANGE LIFT ARM ARRANGEMENT FOR SUPPORT STRUCTURE
AND METHOD OF SECURING AN ATTACHMENT THERETO
Filed Aug. 13, 1963   3 Sheets-Sheet 2
INVENTOR
FLORENCE S. GATERMAN
BY
ATTORNEY

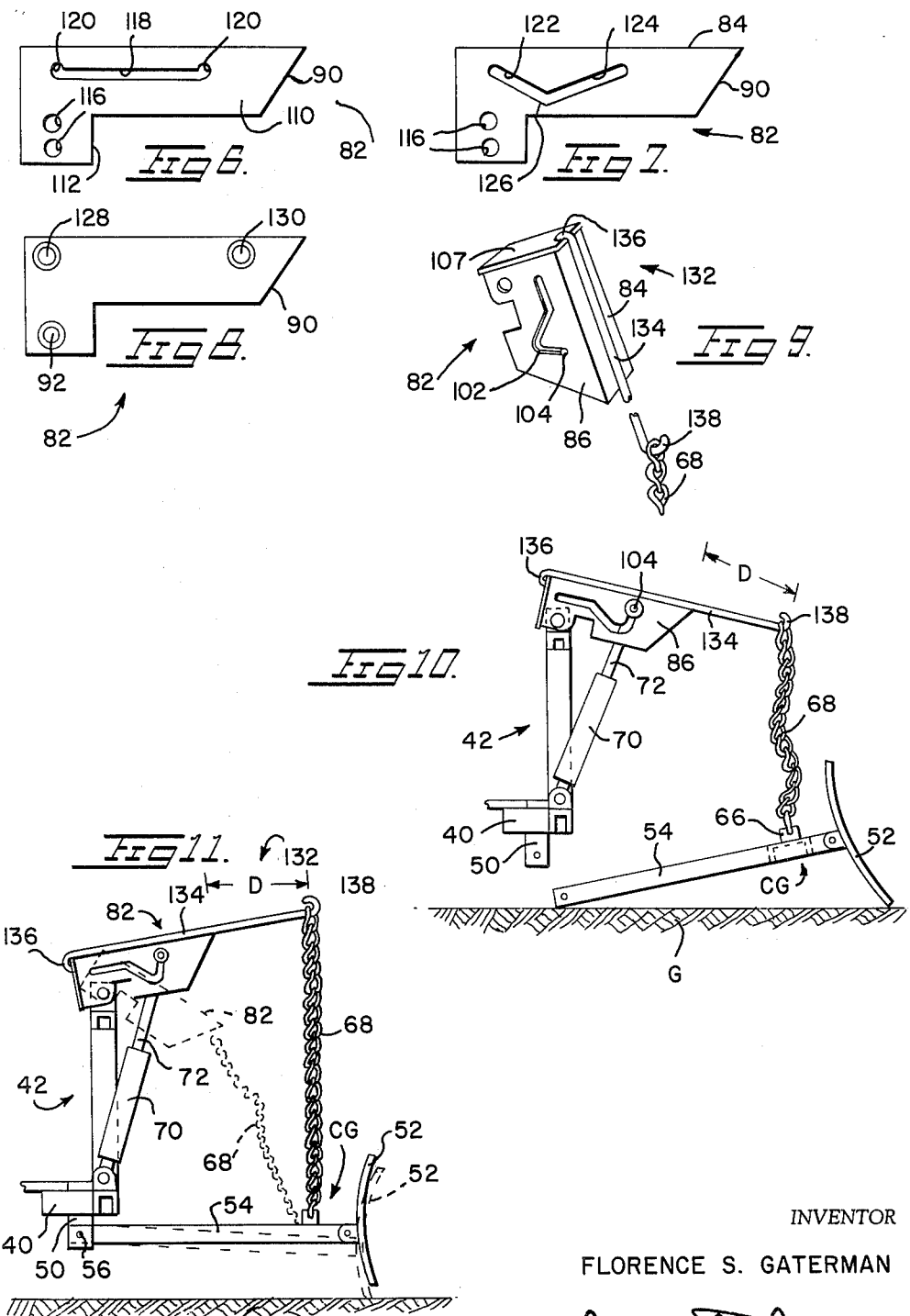

United States Patent Office 3,252,716
Patented May 24, 1966

3,252,716
QUICK CHANGE LIFT ARM ARRANGEMENT FOR SUPPORT STRUCTURE AND METHOD OF SECURING AN ATTACHMENT THERETO
Florence S. Gaterman, Memorial Drive, Manitowoc, Wis.
Filed Aug. 13, 1963, Ser. No. 301,872
20 Claims. (Cl. 280—479)

This invention relates to support structure and more particularly to an improved arrangement therein as well as a novel method of securing an attachment thereto.

Existing currently available support structure which is employed in combination with a land type vehicle to removably secure to the vehicle an attachment of the implement type, such as a snow plow or the like, normally projects beyond the extremities of the vehicle when the attachment implement has been removed from the vehicle, in which position the support structure is easily subject to damage as well as being a possible cause for damage.

Accordingly, it is an object of this invention to provide support structure for removably mounting an attachment to base structure in a manner which will enable the support structure to be entirely disposed within the extremities of the base structure when the attachment has been removed therefrom.

It is another object of the present invention to provide support structure normally employed for removably mounting an attachment to a vehicle with an improved lift arm arrangement which enables the attachment to be positioned relative to the vehicle as desired, with the lift arm arrangement being operable to dispose the support structure in an inoperable, closed or retracted first position so that no part of the support structure will protrude or project outwardly from the vehicle with the support structure further being positioned so as not to interfere with any other attachment which may be mounted on the vehicle.

It is another object of the present invention to provide support structure for removably mounting an attachment to a vehicle with an improved lift arm arrangement which will enable the support structure to be disposed in a closed, retracted, inoperative first position with the attachment removed therefrom in an manner that does not increase the overall extent of the vehicle and therefore enables a more efficient operation of the vehicle in situations such as parking under close conditions or the like.

It is still another object of the present invention to provide quick change support structure for removably mounting an attachment to a vehicle with an improved lift arm arrangement which enables the support structure to be disposed in a retracted, closed, inoperative first position with the attachment removed therefrom with the support structure being entirely within the confines defined by the extremities of the vehicle and thus prevent possible injury to individuals or their clothing and possessions.

Yet another object of the present invention is to provide support structure for removably mounting an attachment of the implement type to a vehicle with a linkage arrangement which will enable the support structure to be disposed in a position with the implement attachment removed therefrom wherein the support structure does not project or protrude outwardly from hte vehicle and thus not increase the overall extent of the vehicle.

Still yet another object of the present invention is to provide support structure for removably mounting an attachment to a vehicle with an improved linkage arrangement which will enable the support structure to be disposed in a first position with the attachment removed therefrom wherein the support structure does not project outwardly beyond the extremities of the vehicle and will thus enable the vehicle to be employed to push another vehicle without causing damage thereto.

An additional object of the present invention is to provide support structure for removably mounting an attachment to a base structure with an arrangement which will enable the support structure to be disposed in a first position with the support structure being within the extremities of the base structure and apparatus for urging the support structure to move from the first position to other positions, with the arrangement having a configuration which will cover the apparatus that is associated therewith when the support structure is in the first position.

It is also an additional object of the present invention to provide support structure having a lift arm arrangement operatively connected therewith and a longitudinally extensible piston-cylinder apparatus for actuating the lift arm arrangement between a plurality of positions wherein the lift arm arrangement is of a configuration which will enable the lift arm arrangement to substantially enclose the piston-cylinder apparatus and thus protect the piston-cylinder apparatus against damage, corrosion, destruction, and deterioration due to influences such as weather, or other instrumentalities, for example by engagement or contact with another structure.

It is also another additional object of the present invention to provide support structure having an improved lift arm arrangement for securing an attachment to a base support in which movement of the lift arm arrangement from an inoperative to an operative position whereat the lift arm arrangement is capable of being secured to the attachment, with such movement being accomplished simply by lifting one end portion of the lift arm arragement.

It is still a further additional object of this invention to provide a device for use with support structure which will facilitate in the securement of an attachment to the support structure.

Also, as yet still a further another object of the present invention is to provide a device for use with support structure releasably mounting an attachment such as an implement to a vehicle which will facilitate in enabling such an attachment to be directly secured to the support structure wherein the device comprises an elongate rod-like member having the opposed end portions thereof bent in opposite directions, with one so bent end portion of the device being adapted to be connected to the support structure with the other so bent end portion adapted be connected to the attachment.

It is also within the contemplated objects of the present invention to provide a novel method of securing an attachment to support structure.

In addition, it is a contemplated object of the present invention to provide a novel method for securing an attachment of the implement type to support structure carried by a vehicle wherein such method comprises providing a device which is removably disposed on the support structure and which projects therefrom a distance greater than the distance which the support structure normally is disposed, with the device being releasably securable to the implement attachment at a location thereon which is approximately the center of gravity and then moving the implement attachment until the implement attachment is supported solely through the device and then partially securing the implement structure to the support structure of the vehicle and releasing the device and removing same therefrom, and thereafter completing the securement of the implement attachment to the support structure.

Other objects and important features of the invention will be apparent from a study of the specification following, taken with the drawing which together show, describe, and illustrate certain preferred embodiments or modifications of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawing:

FIGURE 1 is a perspective view of a vehicle having support structure to which there is removably secured an attachment of the implement type wherein there is provided an arrangement for enabling the support structure to be disposed completely within the confines as defined by the extremities of the vehicle when the attachment has been removed from the support structure.

FIGURE 2 is a side elevational schematic type view illustrating the support structure, the arrangement with the attachment being secured thereto in an operating position.

FIGURE 3 is a detailed partial side elevational view illustrating the support structure and the arrangement disposed in a first or inoperative position wherein the support structure is disposed entirely within the confines of the extremities of the vehicle by reason of the arrangement that is associated therewith.

FIGURE 4 is a detailed side elevational view similar to FIGURE 3 of the drawing and illustrating the support structure and the arrangement in a second or the operating position as illustrated in FIGURE 2.

FIGURE 5 is a detailed side elevational view similar to FIGURES 3 and 4 of the support structure and the arrangement disposed in a third or extended position.

FIGURE 6 is a side elevational view of an embodiment or modification which the arrangement may take.

FIGURES 7 and 8 are similar to FIGURE 6 and illustrate further embodiments or modifications which the arrangement may take.

FIGURE 9 is an isometric illustration of a device which may be used in combination with the arrangement and the support structure for facilitating in the securement of the attachment to the support structure, and FIGURES 10 and 11 are partial side elevational views similar to FIGURE 2 of the drawing and which, when taken together, illustrate an improved method of mounting the attachment to the support structure of the vehicle.

Attention is now directed to FIGURES 1 and 2 of the drawing wherein there is illustrated base structure such as a vehicle 10 which, for the purpose of illustration only, has been shown of the "Jeep" type. As in conventional practice, the base structure or vehicle 10 is provided with a hood 12 having a generally horizontally disposed top surface 14, a generally vertically disposed front surface 16, and a generally laterally or transversely extending bumper 18 that is suitably secured to a portion of the frame structure or chassis of the vehicle 10 by well-known means in any conventional well-known manner. The bumper 18 is affixed to the frame structure of the vehicle 10 so that the bumper 18 is disposed forwardly of the front surface 16 of the hood 12 to define a space 20 therebetween. Ground supported wheels 22 are suitably secured by well-known means to an axle 24 which may form a part of the frame structure or chassis of the vehicle 10.

Support structure 26 is provided on the vehicle 10 for removably mounting thereto an attachment 52 such as an implement or other similar means which may be employed with the vehicle 10 to accomplish a desired result and which may also be propelled if needed therefrom. For the purpose of illustration only, the attachment 52 has been shown in the drawing as a snow plow type of implement.

Further, and also for the purpose of illustration only the support structure 26 may comprise a pair of rearwardly extending longitudinal braces 28 spaced apart laterally relative to each other and which may be formed of channel members. Disposed across the rear end portions of the braces 28 is a channel member 30 extending generally transversely of the vehicle 10 and secured to the braces 28 by any suitable means, such as welding. Lower clamping plates 32 may be welded to the lower leg of the transverse member 30, as shown in FIGURE 2, and thus adapted to clamp against the axle 24. Upper clamping plates or members 34 may be provided for clamping against or seating on top of the axle 24. The clamping plates 32–34 and the transverse channel member 30 are provided with a plurality of aligned apertures or holes therein to receive bolt members 36 therethrough in order to secure the support structure 26 to the frame or chassis of the vehicle 10.

The support structure 26 may also be provided with an angle iron member 38 extending transversely of the vehicle 10 and secured to the front end portions of the braces 28 by welding or the like. Secured to the lower leg of the angle iron member 38 is a forward transverse member 40 which extends below and forwardly of the front surface 16 of the engine hood 12, and into the space 20 defined by the front surface 16 and the bumper 18. The support structure 26 further may comprise frame structure 42 that is secured to the front edge portion of the transverse member 40 by means such as welding and, while the frame structure 42 is illustrated as being of substantially rectangular configuration it is to be understood that other shapes or forms may be taken by the frame structure 42.

The frame structure 42 comprises a pair of substantially horizontal generally transversely extending channel members 44 and a pair of substantially vertical members 46, all of which may be welded together in end-to-end relationship to form a rigid unit so as to provide an open area or space 48 therewithin. The frame structure 42 has the lower transverse channel member 44 disposed in the space 20 and directly to the rear of the bumper 18, as best shown in FIGURE 2 of the drawing. The frame structure 42 is disposed in the space 20 so that there is a clearance between the frame structure 42 and the rear side portion of the bumper 18 and the front surface 16 of the hood 12, respectively. The vertical members 46 of frame structure 42 have the upper end portions thereof disposed substantially below the top surface 14 of the hood 12.

The transverse members 40 of the support structure 26 may have two short vertical struts 50 welded to the lower portions thereof in laterally spaced relationship relative to each other and bolt holes or apertures are provided therein for receiving securing means 56 such as bolts, pins or the like therein which removably connect the attachment 52 thereto. The vertical struts 50 extend below the lower edge of the bumper 18, as best shown in FIGURE 2 of the drawing, with the bolt holes or apertures being disposed below the lower edge of the bumper 18 so that the attachment 52 may be properly connected thereto in a manner and method as will be described and disclosed in more detail hereinafter.

The attachment 52, as illustrated, is provided with a pair of spaced apart, generally longitudinally-extending channel members 54 connected adjacent the rear end portions thereof by the bolts or pins 56 to the vertical struts 50 and connected adjacent the front end portions thereof by suitable means 58 to lug or ear members 60 which may be welded or otherwise secured to the attachment 52. A transverse channel member or brace 62 extends between the longitudinal channel members 54 of the attachment 52 and is also secured thereto by means such as welding, with the member 62 being provided with an opening or slot 64 therein through which there may project an upstanding ear or plug 66 for receiving a connection 68 such as a chain which enables the attachment 52 to be raised and lowered or moved, actuated or in other ways positioned as desired in a manner which will be described and disclosed in more detail hereinafter.

Means which may be in the form of a longitudinally extensible hydraulically actuated ram-like apparatus having a cylinder 70, in which there is disposed a piston connected to a piston rod 72 extending from the upper end portion of the cylinder 70, is disposed centrally of the lower channel member 44 of the frame structure 42 and is pivotally connected thereto through pivot means 74 in the form of a bolt or pin disposed through spaced upstanding lugs or ears 76 which may be secured to the lower channel member 44 of the frame structure 42 with the bolt or pin also extending through a lug member 78 secured to the lower end portion of the cylinder 70. Hydraulic fluid such as oil may be supplied to the lower end of the cylinder 70 through supply conduit means 80 from a fluid source, not illustrated, by pumping means that is associated with a power plant (not shown) of the vehicle 10, to power, actuate and otherwise operate the cylinder 70 to position the attachment 52 as desired.

An arrangement 82 is provided which comprises an elongate lift arm member or link preferably made of heavy gauge channel-like material and which is pivotally mounted or secured adjacent one end portion thereof to the central portion of the upper channel member 44 of the frame structure 42 through pivot means 92.

The lift arm arrangement 82 comprises a central elongate front section or body member 84 having depending therefrom in a common direction oppositely disposed subtsantially like side sections 86 with the portion of the lift arm arrangement 82 that is disposed opposite the front section or body member 84 thereof being open and substantially unobstructed. The body or base section 84 and side sections 86 of the lift arm arrangement 82 define a substantially U-shaped configuration in cross section.

The side sections 86 of the lift arm arrangement 82 are provided with a plurality of pairs of substantially laterally aligned generally like mating or matching apertures which, in the embodiment or modification of the invention as illustrated in FIGURES 1 through 5 of the drawing, comprise recesses or cut-out portions 88 into which a part of the upper channel member 44 is received when the lift arm arrangement 82 is in the operative position as illustrated in FIGURE 3 with the attachment 52 being removed with the recesses 88 being disposed intermediate the end portions of the lift arm arrangement 82. Other apertures may be formed in the side sections 86 of the lift arm arrangement 82 such as openings disposed adjacent the one end portion thereof for enabling the pivot means 92 to be secured to upstanding lugs or ears 94 carried by the upper channel member 44. Also, it is to be noted that the other end portion of the side sections 86 of the lift arm arrangement 82 are cut away to create reduced portions 90 which are inclined to the front section or body member 84 of the lift arm arrangement to create a clearance and eliminate any obstruction that may normally occur when the lift arm arrangement 82 is disposed in the inoperative position as illustrated in FIGURE 3 of the drawing and thus clear any portion of the support structure 26 as well as the bumper 18 of the vehicle 10.

In addition, the apertures in the side sections 86 of the lift arm arrangement 82 may take still other forms or shapes, such as elongate slots 96 which, in the embodiment of the invention as illustrated in FIGURES 1 through 5, comprise substantially straight section 98 disposed adjacent the one end portion of the lift arm arrangement 82 and extends substantially parallel to the plane of the front section or body member 84 to a first location 100 adjacent the respective recess 88 and thereafter angled from the front section or body member 84 at approximately a 45° angle relative to the straight section 98 thereof and then, from a second location 102, toward the front section or body member 84 at substantially a right angle relative to the straight section 98 so that the slots 96 have a substantially single wing V shape or configuration. The second location 102 of the slots 98 is disposed substantially beyond the midpoint of the length of the respective side sections 86 and are near the other end portion of the lift arm arrangement 82.

The upper end portion of the piston rod 72 is provided with a transverse bolt member 104 that extends therethrough and which also extends through the elongate slot 96 in each side section 86 of the lift arm arrangement 82 to secure the piston rod 72 thereto.

The upper end of the connection 68 is fastened in any suitable manner to a key-shaped slit 106, as best shown in FIGURE 1 of the drawing, that is provided in the other end portion of the front section or body member 84 of the lift arm arrangement 82.

A closure 107 is provided for the one end portion of the lift arm arrangement 82 which may be in the form of a plate-like member that is secured to each of the side sections 86 as well as the front section or body member 84 in spaced relationship to the lugs or ears 94 on the upper channel member 44, so that the closure 107 together with the front section or body member 84 together with the side sections 86 of the lift arm arrangement 82, will protect the cylinder 70 and piston rod 72 apparatus from damage through exposure to weather conditions as well as accidental engagement particularly when the lift arm arrangement 82 is in the inoperative position as shown in FIGURE 3 of the drawing.

Referring to FIGURE 3 of the drawing, the lift arm arrangement 82 is illustrated in a first position which is fully closed, retracted or inoperative, with the attachment 52 being removed therefrom. In this position, the piston rod 72 is in a fully retracted position relative to the cylinder 70 and disposed closely adjacent the frame structure 42 so that the upper end portion of the cylinder 70 is contiguous to the upper transverse member 44. Also, in this position, the lift arm arrangement 82 is in a closed position and is disposed substantially vertically with the recesses 88 receiving or enclosing a part of the upper channel member 44. Further, it is to be noted that the front section or body member 84 of the lift arm arrangement 82 is disposed in a position so that the entire arrangement 82 is within the peripheral boundary of the bumper 18 and does not extend or project therebeyond. Thus, the bumper 18 is the most outwardly projecting portion of the vehicle 10, with the support structure 26–42 and the lift arm arrangement 82 being entirely within the confines of a generally vertically disposed plane VP which passes through or which is common to the location of the bumper 18. In other words, when the support structure 26–42 has the lift arm arrangement 82 disposed in the first or inoperative position, the entire support structure and lift arm arrangement is disposed within the confines of the extremities of the vehicle 10.

In the inoperative, closed or first position the bolt member 104, as may be clearly seen in FIGURE 3, is also disposed in the uppermost portion of the straight section 98 of the slots 96. It should also be apparent that in this position the one end portion of the side sections 86 and the front section or body member 84 are disposed just above the upper transverse channel member 44 of the frame structure 42, well below the top surface 14 of the hood 12 so that the lift arm arrangement 82 does not extend or project above the hood 12 of the vehicle 10.

Movement of the lift arm arrangement 82 from the first, closed, retracted or inoperative position of FIGURE 3 to a second operative, open, or semi-extended position, as shown in FIGURE 4 of the drawing, is accomplished merely by lifting the other end portion of the lift arm arrangement 82. Then the piston rod 72 and the bolt member 104 which is connected thereto fall forwardly by the forces created through gravity, moving along the sections 98 through the locations 100, 102, of the elongate slots 96. When the bolt member 104 moves past the second location 102 in the slots 96, hydraulic fluid may be supplied to the interior of the cylinder 70 through the conduit means 80 so as to extend the piston rod 72 to move upwardly and urge the lift arm arrangement 82 generally outwardly and upwardly to the second semi-extended or open, operative position as shown in FIGURE 4, in which position the bolt member 104 is disposed in the extreme upper end 108 of the slots 96.

When the connection 68 has been properly secured to the slit 106 of the lift arm arrangement 82 and to the upstanding ear 66 of the attachment 52 with the longitudinal channel members 54 being properly secured by the means 56 to the vertical struts 50, the attachment 52 may be properly positioned such as raising or lowering through the actuation, movement or charging of the cylinder 70 so that the piston rod 72 moves, with the lift arm arrangement 82 being responsive to such movement.

When it is desired to remove the attachment 52 from the vehicle 10 and return the lift arm arrangement 82 and the piston rod 72 to the inoperative or retracted first position, the attachment 52 is lowered to the ground by discharging fluid from the cylinder 70 so that the piston rod 72 begins to retract. The connection 68 is then removed from the lift arm arrangement 82 and the arrangement 82 is then raised upwardly so that the bolt member 104 slips or slides downwardly past the second location 102 in the slots 96. Then, a slight rearward pressure is maintained on the cylinder 70 and on the lift arm arrangement 82 so that the bolt member 104 moves along the straight sections 98 of the slots 96 and the entire lift arm arrangement 82 folds back into the fully closed or retracted first position as shown in FIGURE 3. The means 56 is then disconnected so that the attachment 52 is completely removed from the vehicle 10 and the vehicle 10 in now ready for normal usage without the attachment 52 being secured thereto.

Thus, the present invention provides a quick change lift arm arrangement 82 which when disposed in the closed or retracted first position does not protrude or project beyond the confines defined by the extremities of the vehicle 10; encloses the fully retracted piston rod 72 and the cylinder 70, and is disposed in a substantially vertical position in the space 20 between the bumper 18 and the front surface 16 of the vehicle hood 12 so that no portion of the lift arm arrangement projects above the hood 12 and the cylinder 70 and the piston rod 72 are protected from any mechanical damage from contact with other vehicles and the like, as well as corrosion from weather.

The present invention further provides a quick change lift arm arrangement 82 that does not increase the height or overall length of the vehicle 10 so that parallel parking is possible under close city street conditions and further prevents injury to personnel or their clothing when walking or working about the vehicle 10.

Referring to the embodiments of the invention which are illustrated in FIGURES 6 through 8 of the drawing, it is to be noted that similar structural elements have been designated by like reference characters and that in operation each of these embodiments are operable in a manner that is similar to that which has already been described and disclosed in connection with the embodiment of FIGURES 1 through 5. In FIGURES 6 through 8, the lift arm arrangement 82 is provided with side sections 110, each of which have laterally aligned pairs of apertures in the form of an elongate cut-out, recess or reduced portion 112 therein which extend throughout substantially the entire longitudinal extent thereof. The apertures 112 are disposed in a manner to receive the part of the upper channel member 44 when the lift arm arrangement 82 is disposed in the inoperative first position and further cooperate to increase the size of the reduced portion 90 adjacent the other end portion of the lift arm arrangement 82 for the purpose of clearing any other parts of the support structure 26–42 as well as the bumper 18 of the vehicle 10.

In the embodiments as illustrated in FIGURES 6 and 7, the apertures of the lift arm arrangement 82 also comprise openings 116 disposed adjacent the one end portion of the lift arm arrangement 82 for adjustably and selectively pivotally mounting the lift arm arrangement 82 to the pivot means 92 carried by the upper channel member 44 of the frame structure 42.

In FIGURE 6, the apertures comprise a substantially straight elongate slot 118 formed in each of the side sections 110 with the slots 118 extending from adjacent each of the end portions of the lift arm arrangement whereat they are provided with enlargements 120.

In FIGURE 7, the apertures comprise a pair of substantially straight elongate slots 122, 124, which diverge from the front section or body member 84 of the lift arm arrangement 82 in converging relationship relative to each other from adjacent the respective end portions thereof to define a substantially V-shaped configuration, with the slot 124 being of a length substantially greater than the corresponding length of the slot 122 and with the inner section of the slots 122–124 defining a location 126 that is similar to the second location 102 of the embodiment previously disclosed and described that is illustrated in FIGURES 1–5 of the drawing.

It is to be understood that in each of these modifications or embodiments of the invention the bolt member 104 which is carried by the piston rod 72 is slidably positioned within the slots 118, 122–124, as the case may be, and is operable therein in a manner that is similar to the operation thereof as described with regard to the embodiment of this invention that is illustrated in FIGURES 1 through 5 of the drawing.

In the embodiment of the invention as illustrated in FIGURE 8 of the drawing, the lift arm arrangement 82 is substantially similar to the embodiments thereof as shown in FIGURES 6 and 7 except that the apertures which are formed in the side sections 110 of the lift arm arrangement 82 do not comprise an elongate slot and in place thereof there is provided a pair of longitudinally spaced apart holes or openings 128 and 130 which are located adjacent the one and the other end portions, respectively, of the lift arm arrangement 82. When the lift arm arrangement 82 is in the closed, retracted or first position as shown in FIGURE 3, the bolt member 104 that is carried by the piston rod 72 of the apparatus is connected to the side sections 110 by inserting the member 104 through the laterally aligned holes or openings 128, and on extension of the cylinder 70 and piston rod 72 apparatus to dispose the support structure 26–42 in the operating extended second position as illustrated in FIGURE 4, the bolt member 104 is inserted through the holes 130 which are located in the other end portion of the side sections 110 of the lift arm arrangement 82. Thus, in this embodiment of the invention, the lift arm arrangement 82 is provided with apertures that are disposed adjacent the opposite end portions of the side sections 110 of the lift arm arrangement 82 in lieu of the elongate slots 96, 118, 122, 124, as previously described and disclosed in connection with the respective embodiments or modifications of the present invention.

Under certain conditions during the operation of the vehicle 10 with the attachment 52 mounted on the support structure 26–42, it may be desirable that the attachment 52 should be further raised or extended relative to the vehicle 10 and as illustrated in FIGURE 5 of the drawing there is shown a third fully-extended or extreme position which is desirable for purposes such as stacking, lifting or in other ways handling a load other than when the support structure 26–42 and lift arm arrangement 82 are positioned as illustrated in FIGURE 4 of the drawing.

Attention is now directed to FIGURE 9 of the drawing wherein there is illustrated a device 132 which may be employed or utilized in attaching, mounting or otherwise securing the attachment 52 to the structure 26–42 of the vehicle 10. The device 132 comprises an elongate rod-like member or element having a substantially straight relatively rigid central portion 134 that is provided adjacent each end portion thereof with hook-like parts 136 and 138 that extend therefrom in opposite directions relative to each other with the one hook-like part 136 being in engagement with the closure 107 of the lift arm arrangement 82. As more fully and clearly illustrated in FIGURES 10 and 11 of the drawing, the elongate device 132 projects beyond the other end portion of the lift arm arrangement 82 a substantial distance D so that the other hook-like part 138 is spaced outwardly from the other end portion of the lift arm arrangement 82 and is disposed at a location which may be easily positioned substantially directly above the center of gravity CG of the attachment 52. In actual practice, it is highly desirable that the securement defined by the upstanding ear or lug 66 on the attachment 52 be positioned thereon at approximately the center of gravity CG. In order to be able to have a single individual mount or secure the implement 82 to the support structure 26–42 alone, without requiring additional help or assistance from other individuals, it is merely necessary that the device 132 be placed on the lift arm arrangement 82 with the one hook-like end part 136 of the device 132 being in engagement with the closure 107 and the other hook-like end part 138 projecting the substantial distance D outwardly from the lift arm arrangement 82. The implement attachment 152 is resting on ground G and the individual then positions the vehicle 10 so that the other hook-like end part 138 is positioned substantially above the center of gravity CG and attaches the connection 68 between the other hook-like end part 138 and the ear or lug 66, as shown in FIGURE 10. Through proper controls, not illustrated, which may be carried by the vehicle 10 adjacent the support structure 42, the individual or operator merely extends the cylinder 70-piston rod 72 apparatus to a position as illustrated by the solid lines of FIGURE 11, which places the lift arm arrangement 82 in the extended position as previously illustrated in FIGURE 5 so that the implement attachment 52 is freely supported through the connection 68, the device 132, the lift arm arrangement 82 and the support structure 26–42.

While in the freely-supported position as illustrated by solid lines in FIGURE 11 of the drawing, the operator or individual merely then swings the implement attachment 52 so that the longitudinal channel members 54 of the implement attachment 52 are easily secured to the vertically depending struts 50 by the bolts or pins 56.

Thereafter, the cylinder 70 and the piston rod 72 apparatus are retracted to position the support structure 26–42, the lift arm arrangement 82, the device 132, the connection 68 and the implement 52 in a position corresponding to the position illustrated by the dotted lines in FIGURE 11 of the drawing whereat the device 132 is removed from the lift arm arrangement 82 with the implement attachment 52 again resting on the ground G and on removal of the device 132 the connection 68 is released from the other hook-like end part 138 and then attached to the key-shaped slot 106 that is provided in the other end portion of the lift arm arrangement 82.

Thereafter, it is merely necessary for the operator or individual to again extend the cylinder 70-piston rod 72 apparatus to the operating or second position as illustrated in FIGURE 4 of the drawing whereat the implement attachment 52 will be positioned as desired to enable the operator of the vehicle 10 to perform whatever functions that may be desired.

In order to dismantle or remove the implement attachment 52 from the support structure 26–42 of the vehicle 10, it is merely necessary to only retract the cylinder 70-piston rod 72 apparatus to the position illustrated in dotted lines of FIGURE 11 whereat the connection 68 is removed from the key shaped slot 106 of the lift arm arrangement 82 and the bolts or pins 56 are removed from the vertically depending struts 50 and longitudinally extending channel members 54 so that the implement attachment 52 again is resting on the ground G, at which time the vehicle 10 may then be backed away from the ground-supported implement attachment 52.

On removal of the implement attachment 52 from the support structure 26–42 of the vehicle 10, the cylinder 70 and the piston rod 72 of the apparatus is further contracted to the inoperative or first position as illustrated in FIGURE 3, wherein the intire support structure 26–42 as well as the cylinder 70-piston rod 72 apparatus and the lift arm arrangement 82, are disposed entirely within the confines defined by the extremities of the vehicle 110 which are illustrated as the substantially vertically disposed plane VP in FIGURE 3 of the drawing.

While the invention has been described and disclosed in terms of certain embodiments or modifications which it has assumed in practice, the scope of the invention should not be deemed to be limited by the precise embodiments or modifications herein shown, described, illustrated and disclosed, such other embodiments or modifications being intended to be reserved especially as they fall within the scope of the claims here appended.

I claim as my invention:

1. Support structure for removably supporting an attachment to a vehicle, said support structure comprising
   a lift arm type arrangement having
   an elongate member,
   means for pivotally mounting said elongate member adjacent one end portion thereof to the support structure for movement between a first position whereat the elongate member is disposed entirely within the confines defined by the extremities of the vehicle with such attachment being removed therefrom to a second position whereat the elongate member will project beyond the extremities defined by the vehicle and such attachment may be secured thereto,
   said support structure having a part thereof which is disposed in the pivotal path of the elongate member during movement thereof between the first and the second positions,
   said elongate member comprising
   a substantially U-shaped body defined by a base section having laterally spaced apart side sections which depend in a common direction from the base section,
   said side sections each having at least one pair of substantially like and generally laterally aligned apertures therein,
   means disposed adjacent the other end portion of the elongate member for releasably securing such attachment thereto, and
   longitudinally extensible and retractible means for urging the elongate member to move between the first and the second positions with the part of the support structure being received in one pair of the apertures in the side sections of the elongate member when the elongate member is disposed in the first position.

2. Support structure for removably supporting an attachment to a vehicle, said support structure comprising
   a lift arm type arrangement having
   an elongate member,
   means for pivotally mounting said elongate member adjacent one end portion thereof to the support structure for movement between a first portion whereat the elongate member is disposed entirely within the confines defined by the extremities of the vehicle with such attachment being removed therefrom to a second position whereat the elongate member will project beyond the extremities defined by the vehicle and such attachment may be secured thereto, said support structure having a part thereof which is disposed in the pivotal path of the elongate member during movement thereof between of the first and the second positions, said elongate member having at least one aperture therein, means disposed adjacent the other end portion of the elongate member for releasably securing such attachment thereto, and longitudinally extensible and retractable means for urging the elongate member to move between the first and the second positions with the part of the support structure being received in the aperture of the elongate member when the elongate member is disposed in the first position.

3. Support structure for removably supporting an attachment to a base, said support structure comprising
a lift arm type arrangement having
an elongate member,
means for pivotally mounting said elongate member adjacent one end portion thereof to the support structure for movement between a first position whereat the elongate member is disposed entirely within the confines defined by the extremities of the base with such attachment being removed therefrom to a second positon whereat the elongate member will project beyond the extremities defined by the base and such attachment may be secured thereto, said support structure having a part thereof which is disposed in the pivotal path of the elongate member during movement thereof between the first and second positions, said elongate member having a recessed portion, and longitudinally extensible and retractable means for urging the elongate member to move between the first and the second positions with the part of the support structure being received in the recess of the elongate member when the elongate member is disposed in the first position.

4. The combination as set forth in claim 1 wherein the one end portion of the elongate member is provided with a cover for enabling the member to enclose the longitudinally extensible and retractable means when the member is disposed in the first position.

5. The combination as set forth in claim 2 wherein the other end portion of the elongate member is reduced for clearance with other parts of the support structure as well as adjacent parts of the vehicle.

6. The combination as set forth in claim 1 wherein the one end portion of the elongate member is provided with a laterally extending plate-like cover for enabling the member to enclose the longitudinally extensible and retractable means when the member is in the first position, and
the other end portion of the member is reduced in size to define a clearance between the member and other parts of the support structure as well as adjacent parts of the vehicle.

7. The combination as set forth in claim 1 wherein the laterally aligned apertures in the side sections of the elongate member define
a recess for receiving the part of the support structure.

8. The combination as set forth in claim 7 wherein the recesses are disposed intermediate the end portions of the elongate member.

9. The combination as set forth in claim 7 wherein the recess commence at a location which is intermediate the end portions of the elongate member and extend therefrom toward the other end portion thereof throughout the remaining longitudinal extent of the side sections.

10. The combination as set forth in claim 1 wherein the laterally aligned apertures in the side sections of the elongate member define
an elongate slot in which the longitudinally extensible and retractable means is slidably disposed, and
a recess for receiving the part of the support structure.

11. The combination as set forth in claim 1 wherein said apertures define
a plurality of openings some of which are located adjacent the one end portion of the elongate member with the remaining openings being disposed adjacent the other end portion thereof.

12. The combination as set forth in claim 1 wherein said apertures define
a generally longitudinally extending elongate slot in each of the side sections of the elongate member in which the longitudinally extensible and retractable means is slidably attached.

13. The combination as set forth in claim 12 wherein the slots are substantially straight and extend generally parallel to the base section of the elongate member.

14. The combination as set forth in claim 12 wherein the slots define
a substantially straight portion disposed adjacent the one end portion of the elongate member, and
a substantially V-shaped portion disposed adjacent the other end portion of the elongate member which intersects the substantially straight section at a location which is intermediate the end portions of the elongate member.

15. The combination as set forth in claim 12 wherein said slots define
a substantially straight portion disposed adjacent each end portion of the elongate member with said straight portions of the respective slot being inclined relative to the base section of the elongate member and converging in a direction away from the base section thereof to a location whereat the slots intersect to define a substantially V-shape configuration.

16. In combination with a lift-type arm arrangement of support structure for removably mounting an attachment of the implement type to a vehicle,
a device for facilitating the mounting of such implement attachment to the lift-type arm arrangement of such support structure,
said device comprising
an elongate element having a length that is substantially greater than the length of the lift-type arm arrangement,
said element having adjacent one end portion thereof means for securing the element to the lift-type arm arrangement with the other end portion of the element projecting therefrom and terminating in spaced relationship relative to the lift-type arm arrangement, and
means for securing the other end portion of the element to such implement attachment at a location thereon which is approximately common to the center of gravity thereof.

17. A device for enabling an attachment of the implement type to be secured to support structure of a vehicle,
said device comprising
an elongate element having a substantially straight relatively rigid central portion which terminates in hook-like end parts that project therefrom in opposed directions relative thereto,
one of the end parts of the element being operable to secure the device to such support structure with the other end part of the device projecting therefrom in spaced relationship thereto and being disposed at a location for securement to approximately the center of gravity of such attachment.

18. A device for securing an attachment to an elongate support of a base structure, said device comprising
an elongate element having a longitudinal extent substantially greater than the longitudinal extent of the elongate support, and
means for removably securing the element to the support with a part of the element projecting therefrom in spaced relationship thereto and terminating at a location which is generally upwardly spaced from the approximate center of gravity of such attachment.

19. A method of securing an attachment of the implement type to support structure carried by a vehicle, said method comprising
providing a device for the support structure which projects from the support structure and extends generally outwardly therefrom and terminates at a location which is spaced relative thereto,
bringing the location of the termination of the device to a position that is generally above the approximate center of gravity of the implement attachment,
securing the device adjacent the terminal location thereof to the approximate center of gravity of the implement attachment,
raising the support structure and the device until the implement attachment is supported through the device,
partly securing the implement attachment to the support structure of the vehicle,
releasing the implement attachment from the device,
removing the device from the support structure, and then
completely securing the implement attachment to the support structure of the vehicle.

20. A method of securing an attachment to a support carried by a base structure,
said method comprising
providing a device for the support which is carried thereby and projects therefrom and terminates at a location in spaced relationship thereto,
placing the terminal location of the device generally above the approximate center of gravity of the attachment,
securing the device adjacent the terminal location thereof to the approximate center of gravity of the attachment,
raising the support so that the attachment is supported through the device and the structure,
partly securing the attachment to the support of the base structure,
releasing the securement of the attachment to the device,
removing the device from the support, and then
completing the securement of the attachment to the support of the base structure.

References Cited by the Examiner

UNITED STATES PATENTS

| | | | |
|---|---|---|---|
| 2,038,975 | 4/1936 | Willetts | 280—491 X |
| 2,134,848 | 11/1938 | Anderson | 172—277 |
| 2,179,070 | 11/1939 | Weise | 280—491 X |
| 2,533,521 | 12/1950 | Silver et al. | 172—272 |
| 2,648,268 | 8/1953 | Lindeman | 172—272 X |
| 2,880,016 | 3/1959 | Peterson | 280—491 |
| 2,958,543 | 11/1960 | Cooper et al. | 280—491 |
| 3,029,880 | 4/1962 | Heberlein | 172—449 X |

LEO FRIAGLIA, *Primary Examiner.*

BENJAMIN HERSH, *Examiner.*

R. C. PODWIL, *Assistant Examiner.*